United States Patent
Zhong et al.

(10) Patent No.: US 11,624,022 B2
(45) Date of Patent: Apr. 11, 2023

(54) PREPARATION METHOD FOR THE PLANT-BASED NANO CORROSION INHIBITION BACTERICIDE FOR OILFIELD AND APPLICATION THEREOF

(71) Applicant: Southwest Petroleum University, Chengdu (CN)

(72) Inventors: Xiankang Zhong, Chengdu (CN); Haonan Li, Chengdu (CN); Zhi Zhang, Chengdu (CN); Junying Hu, Chengdu (CN); Li Zhou, Chengdu (CN); Xi Yuan, Chengdu (CN); Lingjie Li, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/863,859

(22) Filed: Jul. 13, 2022

(65) Prior Publication Data
US 2023/0032736 A1    Feb. 2, 2023

(30) Foreign Application Priority Data

Jul. 16, 2021    (CN) .......................... 202110803933.4

(51) Int. Cl.
*C09K 8/54*    (2006.01)

(52) U.S. Cl.
CPC ............ *C09K 8/54* (2013.01); *C09K 2208/32* (2013.01)

(58) Field of Classification Search
CPC .. C09K 8/54; C09K 2208/10; C09K 2208/32; Y10S 507/92; Y10S 507/939
See application file for complete search history.

(56) References Cited

U.S. PATENT DOCUMENTS

| | | | |
|---|---|---|---|
| 2007/0281866 A1* | 12/2007 | Viloria .................. | C09K 8/524 507/90 |
| 2015/0079174 A1 | 3/2015 | Da Silva Ferreira et al. | |
| 2018/0155597 A1 | 6/2018 | Burns et al. | |

FOREIGN PATENT DOCUMENTS

| CN | 101720785 A | 6/2010 |
|---|---|---|
| CN | 102021583 A | 4/2011 |

(Continued)

OTHER PUBLICATIONS

Title of the Item: Journal of Shanghai Normal University (Natural Sciences) Publication Date: Apr. 15, 2020 Name of the Author: Yan Xi et al. Article Title: PVDF ultrafiltration membranes with superior antibacterial and self-cleaning properties by embedding quaternary ammonium functionalized MWNTs.

(Continued)

*Primary Examiner* — Aiqun Li
(74) *Attorney, Agent, or Firm* — Nitin Kaushik

(57) ABSTRACT

The present invention discloses a preparation method for the plant-based nano corrosion inhibition bactericide for oilfield, comprising the following steps: Step 1. Prepare the aloin liquid; Step 2. Stir the carbon nanotube, hydroxyethyl methacrylate and acrylic acid to react for 4 h at a constant temperature of 80° C. to get the carbon nanotube after fiber treatment, namely the modified carbon nanotube; Step 3. Mix the aloin liquid with imidazoline-ammonium-salt, add acetonitrile, and then add modified carbon nanotube, increase the temperature to 95° C. stir and react for 12 hours, and filter after naturally cooling down to room temperature and get the carbon nanotube loaded with bactericide; Step 4. Stir the carbon nanotube loaded with bactericide, diphenylmethane diisocyanate and polycaprolactone to react for 6

(Continued)

hours at a constant temperature of 95° C. and in the reaction process, continuously inject helium to get the target bactericide.

4 Claims, 2 Drawing Sheets

(56) References Cited

FOREIGN PATENT DOCUMENTS

| | | |
|---|---|---|
| CN | 103160178 A | 6/2013 |
| CN | 1061 18198 A | 11/2016 |
| WO | WO 2021004116 A1 | 1/2021 |

OTHER PUBLICATIONS

Title of the Item: Speciality Petrochemicals Publication Date: Jul. 18, 2020 Name of the Author: Chu Yuge et al. Article Title: Synthesis of Bisimidazoline Quaternary Ammonium Salt and Study on Corrosion Inhibition and Antibacterial Properties.

* cited by examiner

PREPARATION METHOD FOR THE PLANT-BASED NANO CORROSION INHIBITION BACTERICIDE FOR OILFIELD AND APPLICATION THEREOF

CROSS-REFERENCE TO RELATED APPLICATIONS

The application claims priority to Chinese patent application No. 202110803933.4, filed on Jul. 16, 2021, the entire contents of which are incorporated herein by reference.

TECHNICAL FIELD

The present invention relates to the field of oilfield chemistry, in particular to a preparation method for the plant-based nano corrosion inhibition bactericide for oilfield and application thereof, which is used for sterilization on sulfate reducing bacteria (SRB) in water injection well and flowback fluid.

BACKGROUND

For sulfate reducing bacteria (SRB) in oilfield sewage, adding bactericide is one of the most common sterilization methods, but due to long-term use, SRB becomes more resistant to existing bactericide, resulting in reduced sterilization efficiency. In order to achieve considerable sterilization efficiency, it is necessary to increase the dosage of bactericide, which will lead to environmental pollution and create a vicious cycle.

Another common method is biological sterilization. Denitrifying bacteria is a group of bacteria that can reduce nitrate nitrogen to gaseous nitrogen. Denitrifying bacteria can compete with SRB for nutrients, and denitrifying bacteria is the dominant species. SRB will be inhibited due to lack of necessary nutrients. However, in order to achieve significant sterilization effect, multiple denitrifying bacteria species need to be used simultaneously, which could affect the species balance of local microorganisms and pose a threat to the ecosystem.

For example, denitrifying bacteria was used in CN 101313681 A to control SRB in oilfield injection water, but as many as 6 denitrifying bacteria species were added, which may affect the balance of local microbial species and have a potential impact on the environment.

SUMMARY

The purpose of the present invention is to provide a preparation method for the plant-based nano corrosion inhibition bactericide for oilfield and application thereof in view of the shortcomings in existing sterilization method in oilfield.

For the preparation method for the plant-based nano corrosion inhibition bactericide for oilfield provided in the present invention, the steps are as follows:

Step 1. Prepare the aloin liquid: take the fresh aloe leaves for cleaning, disinfection and removing the edges and corners, and then conduct grinding and centrifugal filtration to get aloe juice, sterilize with ultraviolet light, and then perform the decolorization. Filter repeatedly to get the aloe polysaccharide solution and concentrate the solution to get the aloin liquid.

Step 2. Stir the carbon nanotube, hydroxyethyl methacrylate and acrylic acid to react for 4 h at a constant temperature of 80° C. and at a stirring speed of 160 rpm to get the carbon nanotube after fiber treatment, namely the modified carbon nanotube. The mass ratio between carbon nanotube, hydroxyethyl methacrylate and acrylic acid is 1:15:12. In this step, a resin containing side chain active hydroxyl can be generated in the reaction process, which can be used as fiber treatment agent of carbon nanotube to strengthen the adsorption performance of carbon nano acrylic rod.

Step 3. Mix the aloin liquid with imidazoline-ammonium-salt, add acetonitrile to facilitate their better dissolution, and then add modified carbon nanotube. Increase the temperature to 95° C., and stir and react for 12 hours, and filter after naturally cooling down to room temperature and get the carbon nanotube loaded with bactericide. The mass ratio between aloin liquid, imidazoline-ammonium-salt and modified carbon nanotube is 20:15:1.

Step 4. Stir the carbon nanotube loaded with bactericide, diphenylmethane diisocyanate and polycaprolactone to react for 6 hours at a constant temperature of 95° C. In the reaction process, continuously inject helium. The active ingredients (aloin solution and imidazoline quaternary ammonium salt) are loaded on the carbon nanotubes to obtain the target bactericide.

Preferably, the imidazoline-ammonium-salt is one of the imidazoline-ammonium-salt of oleic acid, the imidazoline-ammonium-salt of benzoic acid and the imidazoline-ammonium-salt of fatty acid.

The application method for the plant-based nano corrosion inhibition bactericide for oilfield, which is prepared by the above method, is shown as follows: The sterilization progress is performed in a sterilizing tank. A filter layer is provided near the bottom of sterilizing tank, on which the bactericide is attached, and an ultrasonic device is equipped in the sterilizing tank; the oilfield sewage is pumped into the sterilizing tank, and the ultrasonic device is turned on, so as to start the sterilizing progress.

The sterilized oilfield sewage undergoes secondary treatment to realize oilfield reinjection. The secondary treatment includes flocculation, sedimentation, filtration and other operations in order to remove the precipitated minerals in flowback fluid.

Compared with the prior art, the present invention shows the following benefits:

(1) In the present invention, the aloin and imidazoline-ammonium-salt as cationic surfactant is attached to the carbon nanotube. Due to the sedimentation and absorption action of nanotube, SRB in oilfield wastewater is adsorbed on the surface of carbon nanotubes. Through the sterilization technology described in this patent, the bactericide attached to the carbon nanotubes sterilizes SRB intensively and efficiently, thus reducing the amount of bactericide used. Furthermore, it can also complete the pretreatment of oilfield sewage and make the sewage have certain corrosion inhibition effect.

(2) The fresh aloe and carbon nanotube, etc. as raw materials used in the present invention are non-toxic and harmless environment-friendly materials with few chemical substances added, and the prepared bactericide is environmentally friendly: The bactericide of the patent shows high sterilization efficiency and lasting sterilization effect, and the main agent does not need to be added repeatedly.

(3) The raw materials for the preparation of bactericide are abundant and cheap and easy to obtain. Therefore, the preparation cost of the bactericide is low, and suitable for large-scale application in oilfields.

Other advantages, objectives, and characteristics of the present invention will be partly illustrated by the following

DETAILED DESCRIPTION OF THE EMBODIMENTS

Figure 1:
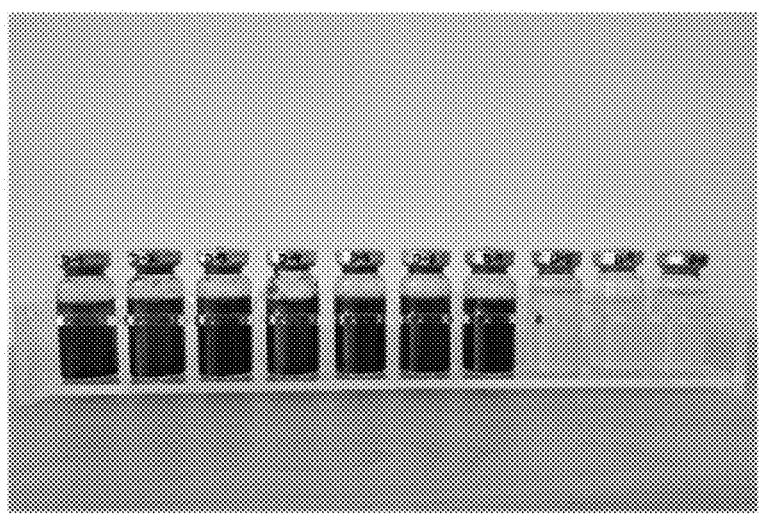
FIG. 1 Sterilization performance test results of bactericide prepared in Embodiment 1

The preferred embodiment of the present invention is described in combination with the following attached drawings. It should be understood that the preferred embodiment here described is only used for explaining the present invention rather than for restricting the present invention.

EMBODIMENT 1

For the preparation method for the plant-based nano corrosion inhibition bactericide for oilfield, the steps are as follows:

(1) Clean the fresh aloe leaves and disinfect with absolute ethyl alcohol. After drying at 30° C. remove the edges and corners and then conduct grinding and centrifugal filtration to get aloe juice. Place the aloe juice in a prepared glass vial and then conduct the sterilization progress with ultraviolet light to get the sterile juice; add activated carbon with a mass concentration of 1.5% into the sterile juice, heat in a water bath of 60° C., adjust the pH to 7.0, perform discoloration for 30 minutes and filter repeatedly to get the aloe polysaccharide solution. Place the aloe polysaccharide solution into a 1 L distilling flask and evaporate about 80% water through decompression concentration at a temperature of 40° C. Add 5(X) mL ethyl acetate to extract for three to five times, and keep the extraction temperature at 50~55° C. Extract for 40 minutes each time and finally get the aloin liquid.

(2) Take carbon nanorod with a mass fraction of 1, hydroxyethyl methacrylate with a mass fraction of 15 and acrylic acid with a mass fraction of 12 to react for 4 h at a temperature of 80° C. and stirring at the speed of 160 r/min. and generate a resin containing side chain active hydroxyl as the fiber treatment agent of carbon nanorod to strengthen the absorption performance of carbon nanorod. Filter after naturally cooling down to room temperature for future use.

(3) Mix the aloin liquid with imidazoline-ammonium-salt of benzoic acid, and add acetonitrile to facilitate their better dissolution where the mass fraction of aloin liquid is 20 and the mass fraction of imidazoline-ammonium-salt is 15. Add the carbon nanorod treated according to Step (2), of which the mass fraction is 1, heat it up to 95° C. and then stir and react for 12 hours. Filter after naturally cooling down to room temperature.

(4) Mix diphenylmethane diisocyanate with a mass fraction of 10 and polycaprolactone with a mass fraction of 7 with the filtered carbon nanotube that absorbs aloin and imidazoline-ammonium-salt to react for 6 hours at a constant temperature of 95° C. In the whole reaction process, inject helium to fully fix the effective constituents loaded on the carbon nanotube and get the plant-based nano corrosion inhibition bactericide for oilfield prepared in the present invention after naturally cooling down to room temperature.

Use the bactericide prepared in Embodiment 1 for bactericidal performance test and corrosion inhibition performance test:

(1) Sterilization Performance Test

Before the test, all devices and glass containers were sterilized for 20 min at 121° C. The SRB strain was isolated from the formation water of an injection well in a shale gas field in China. SRB liquid medium was prepared according to NACE TMO194-94 standard.

The composition of the medium is as follows: Ig yeast powder, 0.1 g ascorbic acid, 0.2 g $MgSO_4 \cdot 7H_2O$, 0.01 g $K_2HPO_4$, 10 g NaCl, 0.2 g $(NH_4)_2Fe(SO_4)_2 \cdot 6H_2O$, 4 mL sodium lactate, and 1000 mL deionized water. A portable pressure steam disinfection pot was used to sterilize the bacteria in the prepared medium. In the sterilization process, the temperature was kept at 120° C. for 15 min. It was then deoxidized with $N_2$ for 2 h. 10% SRB was inoculated into the medium and placed in an incubator at 37° C. After 5 days, the number of SRB reached the peak value and remained stable.

Different bactericides were added into the cultured bacteria solution of 200 mL and counted 24 hours later.

Serial dilution method (triple repetition) was taken for the counting of SRB. Totally 10 dilution levels were provided. At each dilution level, there were three identical vials filled with 9 mL SRB medium. The measured sample of 1 mL was injected into a vial at the Level 0 and then shaken up. The 1 mL solution from the vial at the Level 0 was injected into a vial at the Level 1. The syringe for sampling the liquid each time was disposable to avoid affecting the final results. Similarly, the sample was diluted until the dilution reached Level 9. All vials were incubated at 35° C. for 14 days at a constant temperature.

The growth index should be determined according to the following principles: three dilution levels were selected from the dilution level at which negative vials appeared, and the number of positive vials was counted for each dilution level to obtain the index (When all the vials in a certain grade are negative, the previous grade is counted). The growth index (summarized according to 5.6.5.3 in SY/T 5329-1994) is obtained by multiplying the dilution factor $10^n$ of water sample (n is the number of dilutions before the index position). Check the corresponding bacteria count table and substitute the bacterial count detected by the index to get the content of this kind of bacteria in the water sample (Nr./mL).

The test results are shown in Table 1, in which the vials 1 to 10 are filled with 9 mL SRB medium ($10^7$). The dilution levels are numbered from Lev. 0 to Lev. 9. Take the measured sample of 1 mL into the Vial 1, indicating Level 0; take a new syringe and take 1 mL from Vial 1 to Vial 2, indicating Level 1; take a new syringe and take 1 mL from Vial 2 to Vial 3, indicating Level 3; the rest can be done in the same manner until 1 mL is taken from Vial 9 to Vial 10, indicating Level 9. "+" represents positive vial, and "−" represents negative vial. As shown in FIG. 1, the transparent is the negative vial in which there is no SRB, and the black is the positive vial in which there is SRB.

TABLE 1

Bactericidal performance test results

| Group | Vial 1 Level 0 | Vial 2 Level 1 | Vial 3 Level 2 | Vial 4 Level 3 | Vial 5 Level 4 | Vial 6 Level 5 | Vial 7 Level 6 | Vial 8 Level 7 | Vial 9 Level 8 | Vial 10 Level 9 | Growth index | Number of SRB | Sterilization rate |
|---|---|---|---|---|---|---|---|---|---|---|---|---|---|
| No bactericide | +++ | +++ | +++ | +++ | +++ | +++ | +++ | — | — | — | 300 | 2500000 | 0 |
| Traditional bactericide 1227 (60 mg/L) | +++ | +++ | +++ | +++ | +++ | +++ | ++− | +−− | — | — | 210 | 1500000 | 40% |
| Glutaraldehyde (60 mg/L) | +++ | +++ | +++ | +++ | +++ | +++ | ++− | — | — | — | 200 | 900000 | 64% |
| Bactericide in Embodiment 1 (60 mg/L) | +++ | +++ | +++ | +++ | +++ | ++− | ++− | — | — | — | 220 | 200000 | 92% |

(2) Research the interaction between aloin and imidazoline-ammonium-salt: investigate whether there is a synergistic effect between them through the combined index. The combined index formula of the two agents is as follows:

$$CI = \frac{(D)_1}{(DX)_1} + \frac{(D)_2}{(DX)_2}$$

Where, $(DX)_1$ and $(DX)_2$ are respectively the concentration for the sterilization rate of the two agents reaches X % when they are used alone, and $(D)_1$ and $(D)_2$ are the concentrations for the sterilization rate of X % when the two agents are used together. The CI value may represent the combined index of the two agents. If the value is equal to 1, there will be an additive affect. If the value is larger than 1, there will be an antagonistic effect. If the value is smaller than 1, there will be a synergistic effect. If this value is smaller than 0.5, there will be a strong synergistic effect.

In the embodiment of the present invention, aloin: $(D)_1=300$. $(DX)_1=1000$;

Imidazoline-ammonium-salt of oleic acid: $(D)_2=20$, $(DX)_2=90$;

$CI_{100\%}=0.52$ between aloin and imidazoline-amnmonium-salt of oleic acid, indicating that there is a synergistic sterilization effect between them.

Imidazoline-ammonium-salt of benzoic acid: $(D)_{2a}=35$, $(DX)_{2a}=95$;

$CI_{100\%}=0.67$ between aloin and imidazoline-ammonium-salt of benzoic acid, indicating that there is a synergistic sterilization effect between them.

Imidazoline-ammonium-salt of fatty acid: $(D)_{2b}=40$, $(DX)_b=100$;

$CI_{100\%}=0.7$ between aloin and imidazoline-ammonium-salt of fatty acid, indicating that there is a synergistic sterilization effect between them.

Therefore, there is a synergistic sterilization effect between aloin and imidazoline-ammonium-salt as specified in the present invention.

(3) Corrosion inhibition performance test:

The formula for the corrosive solution is shown in Table 2. The corrosive solution of 1 L was prepared, the pH was adjusted to 6.5, and the temperature was 37° C. at a normal pressure. The N80 steel specimens were processed with specifications of 30*15*3 and placed in corrosive solution. Three specimens were placed in each vial and different corrosion inhibitors were added respectively. The experiment lasted for 14 days.

TABLE 2

Formula for Corrosive Solution

| NaCl | CaCl$_2$ | MgSO$_4$ | NaHCO$_3$ | NaSO$_4$ |
|---|---|---|---|---|
| 30 g/L | 12 g/L | 23.6 g/L | 10.5 g/L | 9.5 g/L |

After the test, the specimens were cleaned with stripping solution (100 ml hydrochloric acid+10 g hexamethylenetetramine+900 mL deionized water), then dehydrated by ethanol and blow-dried with $N_2$. The determination method for static uniform corrosion inhibition rate was evaluated with referring to the Performance Index and Evaluation Method of Corrosion Inhibitor for Oilfield Produced Water Treatment (SY/T 5273-2014), the oil and gas industry standard of the People's Republic of China. The formulas of uniform corrosion rate and corrosion inhibition efficiency are as follows:

$$r_c = \frac{8.76 \times 10^4 \times (m - m_1)}{S \times t \times \rho}$$

Where, $r_c$—Uniform corrosion rate, in mm/a;

m—Mass of the test piece before the test, in g;

$m_1$—Mass of the test piece after the test, in g;

S—Total area of the test piece, in cm$^2$;

ρ—Density of the test piece material, in g/cmi;

t—Test time, in h.

$$\eta_w = \frac{r_0 - r_1}{r_0} \times 100\%$$

Where, $\eta_w$—Corrosion inhibition efficiency, %;

$r_0$—Corrosion rate of blank test piece, in mm/a;

$r_1$—Corrosion rate of test piece added with corrosion inhibitor, in mm/a.

The corrosion inhibition test results are shown in Table 3, in which the corrosion inhibitors 1, 2 and 3 commonly used in oilfields are respectively the lauric acid imidazoline, abietic acid imidazoline and tetradecyl trimethyl ammonium bromide.

TABLE 3

Corrosion inhibition test results

| Group | Dosage (mg/L) | Corrosion rate (mm/a) | Corrosion inhibition efficiency |
|---|---|---|---|
| Blank | — | 0.3254 | — |
| Lauric acid imidazoline | 60 mg/L | 0.0218 | 93.3% |
| Abietic acid imidazoline | | 0.0198 | 93.9% |
| Tetradecyl trimethyl ammonium bromide | | 0.0295 | 90.9% |
| Bactericide used in Embodiment 1 | | 0.0120 | 96.31% |

Figure 2:
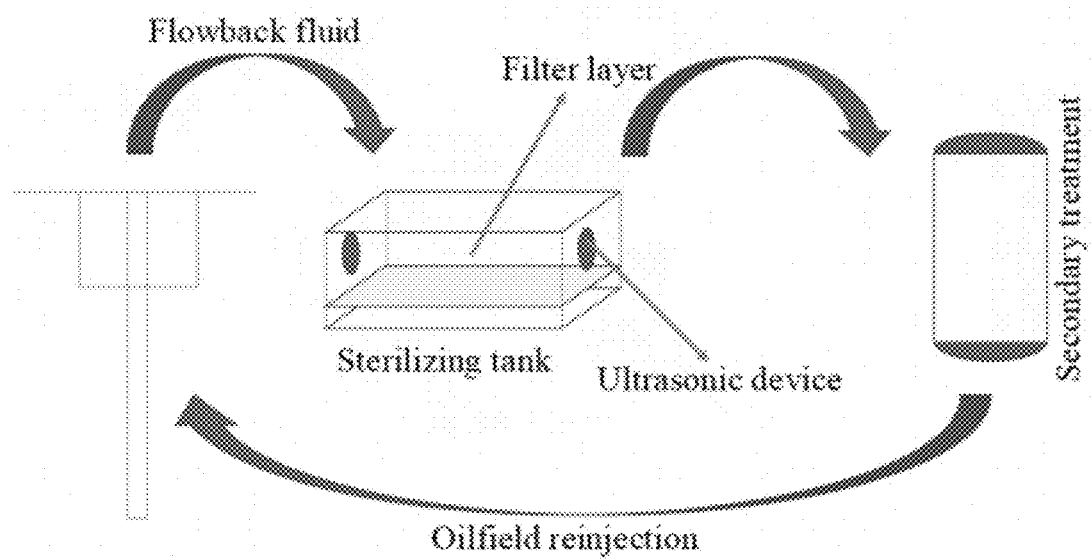
FIG. 2 Application process flow chart of the plant-based nano corrosion inhibition bactericide for oilfield prepared in the present invention

As shown in FIG. 2, the application process of the plant-based nano corrosion inhibition bactericide for oilfield as stated in the present invention is given as follows: The sterilization is performed in a sterilizing tank. A filter layer is provided near the bottom of sterilizing tank, on which the bactericide is fixed, and an ultrasonic device is provided in the sterilizing tank. The flowback fluid is pumped into the sterilizing tank so that SRB in the secondary produced water of oilfield can be attached to the carbon nanotube on the filter layer. The ultrasonic device is turned on so that the bactericide on the carbon nanotube begin to play its bactericidal role, and at the same time the oilfield sewage can be initially treated. The sterilized oilfield sewage undergoes secondary treatment such as flocculation, sedimentation and filtration to remove the precipitated minerals in flowback fluid and realize oilfield reinjection.

The above are only the preferred embodiments, which are not intended to limit the present invention in any form. Although the present invention has been disclosed as above with preferred embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as a part of the technical solution of the present invention.

What is claimed is:

1. A preparation method fora plant-based nano corrosion inhibition bactericide for oilfield, comprising the following steps:

Step 1. Prepare an aloin liquid;

Step 2. Stir a carbon nanotube, hydroxyethyl methacrylate and acrylic acid to react for 4 h at a constant temperature of 80° C. to get a modified carbon nanotube;

Step 3. Mix the aloin liquid with imidazoline-ammonium-salt, add acetonitrile, and then add the modified carbon nanotube, increase the temperature to 95° C., stir and react for 12 hours, and filter after naturally cooling down to room temperature and get a carbon nanotube loaded with bactericide; the mass ratio between the aloin liquid, the imidazoline-ammonium-salt and the modified carbon nanotube is 20:15:1;

Step 4. Stir the carbon nanotube loaded with bactericide, diphenylmethane diisocyanate and polycaprolactone to react for 6 hours at a constant temperature of 95° C., and in the reaction process, continuously inject helium to get the nano corrosion inhibition bactericide.

2. The preparation method for the plant-based nano corrosion inhibition bactericide for oilfield according to claim 1, wherein the Step 1 specifically comprises: take fresh aloe leaves for cleaning, disinfection and removing the edges and corners, and then conduct grinding and centrifugal filtration to get aloe juice; sterilize with ultraviolet light, and then perform a decolorization; filter repeatedly to get an aloe polysaccharide solution and concentrate the solution to get the aloin liquid.

3. The preparation method for the plant-based nano corrosion inhibition bactericide for oilfield according to claim 1, wherein in Step 2, the mass ratio between carbon nanotube, hydroxyethyl methacrylate and acrylic acid is 1:15:12.

4. The preparation method for the plant-based nano corrosion inhibition bactericide for oilfield according to claim 3, wherein in Step 2, the stirring speed is 160 rpm.

* * * * *